(12) United States Patent
Wapniak et al.

(10) Patent No.: US 7,270,303 B1
(45) Date of Patent: Sep. 18, 2007

(54) PINCER APPARATUS FOR NANOSAT TRANSPORT ACROSS A SATELLITE

(75) Inventors: Adam Aaron Wapniak, Brooklyn, NY (US); Steven M. Huybrechts, Oak Hill, VA (US); Alok Das, Albuquerque, NM (US)

(73) Assignee: The United States of America as repesented by the Secretary of the Air Force, Washington, DC (US)

( * ) Notice: Subject to any disclaimer, the term of this patent is extended or adjusted under 35 U.S.C. 154(b) by 129 days.

(21) Appl. No.: 11/232,169

(22) Filed: Sep. 21, 2005

(51) Int. Cl.
*B64G 1/64* (2006.01)
(52) U.S. Cl. .................. 244/172.5; 294/86.4
(58) Field of Classification Search .. 244/172.4–172.6, 244/158.2; 294/86.4
See application file for complete search history.

(56) References Cited

U.S. PATENT DOCUMENTS

| | | | | |
|---|---|---|---|---|
| 3,820,741 | A * | 6/1974 | Ratcliff | 244/172.4 |
| 4,542,858 | A * | 9/1985 | Manges | 242/372 |
| 4,645,411 | A * | 2/1987 | Madwed | 414/753.1 |
| 4,661,037 | A * | 4/1987 | Sugino et al. | 414/729 |
| 4,676,142 | A * | 6/1987 | McCormick et al. | 92/130 R |
| 4,750,769 | A * | 6/1988 | Tebb | 294/86.4 |
| 4,765,669 | A * | 8/1988 | Meier | 294/119.1 |
| 5,040,749 | A * | 8/1991 | Johnson | 244/172.4 |
| 5,104,070 | A * | 4/1992 | Johnson et al. | 244/172.4 |
| 5,125,709 | A * | 6/1992 | Meier, Jr. | 294/119.1 |
| 5,651,574 | A * | 7/1997 | Tanikawa et al. | 294/86.4 |
| 5,884,951 | A * | 3/1999 | Long et al. | 294/86.4 |
| 6,200,199 | B1 * | 3/2001 | Gurusamy et al. | 451/56 |
| 6,361,423 | B2 * | 3/2002 | Gurusamy et al. | 451/443 |
| 6,523,784 | B2 * | 2/2003 | Steinsiek et al. | 244/172.4 |
| 6,893,070 | B2 * | 5/2005 | Baker | 294/86.4 |
| 2003/0183726 | A1 * | 10/2003 | Lounge et al. | 244/158 R |
| 2005/0103940 | A1 * | 5/2005 | Bischof et al. | 244/161 |
| 2006/0151671 | A1 * | 7/2006 | Kosmas | 244/172.6 |

FOREIGN PATENT DOCUMENTS

DE          4208615 C1 * 8/1993

* cited by examiner

*Primary Examiner*—Timothy D. Collins
*Assistant Examiner*—Joseph W Sanderson
(74) *Attorney, Agent, or Firm*—James M. Skorich

(57) ABSTRACT

A pincer system is comprised of an array of pincers. Each pincer includes an inner disk having legs that are pushed downwards onto a pliable material to cause protuberances, while an outer disk is rotated to simultaneously squeeze the extruded material between its legs and those of the stationary inner disk. Tracks provide for slideable movement of the individual pincers. The system, carrying an attached microsatellite, translates across a pliable material covering a spacecraft by coordinating the movement of the pincers with their grasping of the pliable material. This abstract is provided to comply with the rules requiring an abstract, and is intended to allow a searcher or other reader to quickly ascertain the subject matter of the technical disclosure. It is submitted with the understanding that it will not be used to interpret or limit the scope or meaning of the claims.

13 Claims, 9 Drawing Sheets

PINCER APPARATUS FOR NANOSAT TRANSPORT ACROSS A SATELLITE

STATEMENT OF GOVERNMENT INTEREST

The invention described herein may be manufactured and used by or for the Government of the United States for all governmental purposes without the payment of any royalty.

BACKGROUND OF THE INVENTION

The present invention is related to a method and apparatus for performing maintenance and repair on the outer surface of a satellite while the satellite is in orbit. More particularly, the present invention is comprised of movable pincers for latching onto the pliable protective fabric covering the satellite and moving the invention across the fabric, whereby the invention can carry and transport a proximity repair micro-satellite across the fabric to a location requiring repair or maintenance.

Satellites begin to deteriorate after launch, whereupon they are exposed to the deleterious effects of cosmic radiation, solar winds and electro-magnetic radiation while passing through the Van Alen belt. Over time, flecks of space debris may damage the satellite's surface. Continued damage may ultimately corrupt the satellite's hardware and electronic systems. Since there are no means to effect repairs or perform maintenance, satellite components will inevitably begin to malfunction or fail entirely. Depending on the system, the foregoing could render a satellite useless. Thus, for want of a minor repair or routine maintenance, a multi-million dollar satellite could be rendered useless and reduced to orbiting space junk.

Multi-layered insulation (hereinafter called "MLI") is a manufactured material used to cover nearly the entire body of objects placed in orbit, i.e., satellites, and is presently the only known means of providing limited protection to such objects. MLI reflects harmful incident radiation, and also insulates the object from the cold of outer space by using multiple radiation-heat transfer barriers to retard the flow of energy that would otherwise cause damage. Beta cloth is one example of an MLI. It is an inorganic, fiberglass woven cloth impregnated with Teflon® polytetraflouroethylene resin (Teflon is a registered trademark owned by DuPont), and perforated to prevent ballooning. As an outer cover, the Beta cloth MLI has a nominal thickness of 0.008 inches and is rated with a tensile strength of about 90 lb/inch against warping. Its minimum shear strength is 1.8 pounds and it can maintain the foregoing tensile and shear strengths at a temperature of up to 400° F. However, regardless of its composition, MLI is not impermeable, and damage to the satellite nonetheless occurs. Maintenance of an orbiting satellite would also enhance its longevity.

The XSS Micro-satellite series is the Air Force Research Laboratory's sequence of on-orbit experiments to develop a logistics and servicing capability for orbiting satellites. As the name would imply, micro-satellites (hereinafter referred to as "nanosats") are small, agile and compact. They are fully equipped with on-board avionics, propulsion and high-resolution cameras allowing a highly maneuverable nanosat to perform close-proximity inspection. It is the intent of aerospace leaders to expand the capability of such nanosats to include task-specific resources and tools, thereby providing it with the capability to perform maintenance and repair. Such modification of nanosats would permit them to extend the life and performance of an orbiting satellite at substantially less cost, and in less time, than by preparing and launching a replacement satellite from the earth.

Whatever the specific form or composition of the MLI, this protective fabric should provide a medium having sufficient pliability for the present invention to grasp onto and provide transport for a nanosat across the exterior of an orbiting satellite, as will be hereinafter discussed in detail.

Despite the availability of MLI as a means of protection for satellites, there is still a need in the art for means to perform exterior maintenance and repair while the satellite is in orbit. The present invention provides means for transporting a nanosat capable of performing maintenance and repair, across the MLI covering an orbiting satellite. The present invention thus fulfills the aforementioned need in the art.

SUMMARY OF THE INVENTION

Briefly, the present invention is comprised of a pincer system for physically attaching to and maneuvering over the pliable protective material covering a satellite, without damaging the material. A proximity-repair nanosat is carried by the pincer system over the material, allowing the nanosat to locate, assess and/or repair damage to a satellite's protective covering material, the satellite surface underlying the protective material, or its exterior components.

An array of pincers is slideably attached to tracks, wherein the tracks allow independent translation of the pincers along the pliable material's surface. Locomotive means for the pincers are contained in the tracks. In one embodiment, each pincer is comprised of a set two nested disks adapted to simultaneously pinch and twist the pliable protective material covering a satellite and thereby grasp it, without damaging the material. The array of pincers, and thus the entire apparatus and the attached nanosat, is maneuvered across the protective material by coordinating the translation of the pincers along their respective tracks with their grasping of the protective material.

Other aspects and advantages of the present invention will become apparent from the following detailed description, taken in conjunction with the accompanying drawings, and illustrating by way of example the principles of the invention.

DETAILED DESCRIPTION

Figure 1:
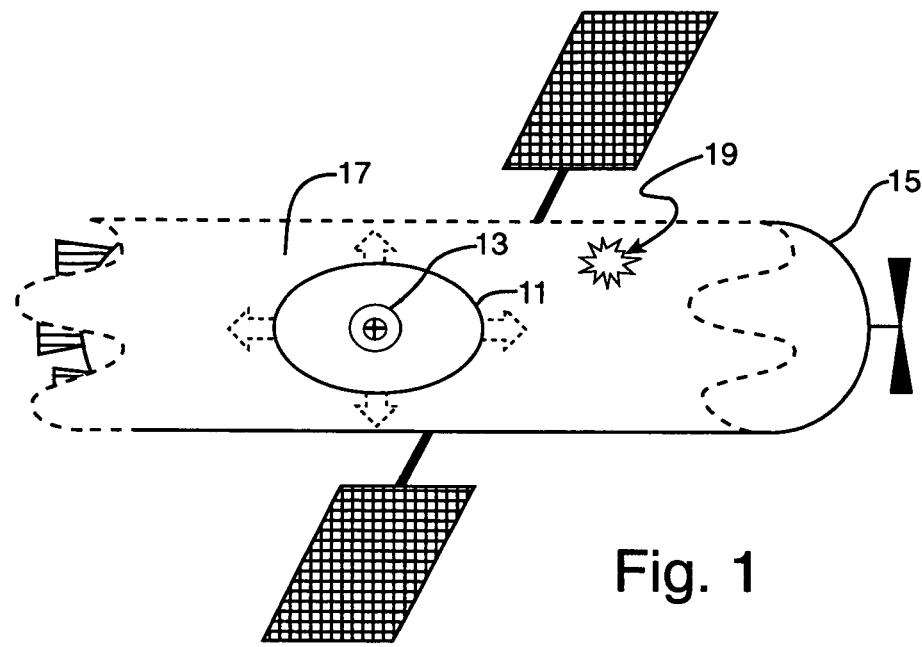
FIG. 1 illustrates a satellite undergoing inspection and repair by a nanosat traversing the satellite's protective covering by means of a pincer system of the present invention.

Turning to the drawings, FIG. 1 illustrates pincer system 11 of the present invention, in conjunction with nanosat 13, undertaking an inspection and repair on orbiting satellite 15. Nanosat 13 is a micro-satellite having resources and tools for inspecting space vehicles, performing maintenance on them and, depending on the extent of the damage, also making repairs. Satellite 15 is covered by pliable multi-layered insulation 17, hereinafter called "MLI" 17. Tear 19 in MLI 17 evinces damage to the underlying structure of satellite 15. Nanosat 13 can be removably attached to pincer system 11. Pincer system 11 is shown traversing MLI 17 while carrying nanosat 13 to tear 19 in MLI 17.

Figure 2:
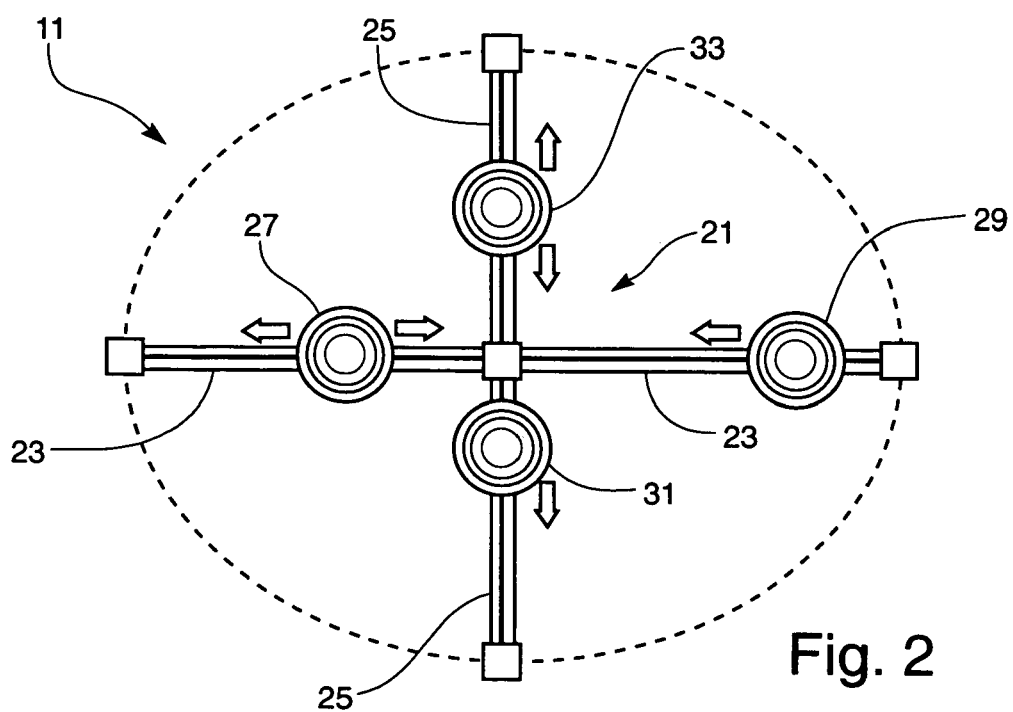
FIG. 2 illustrates a bottom view an embodiment of a pincer system of the present invention that includes four pincers running on a dual track configuration.

FIG. 2 is a bottom view of pincer system 11, showing its underside, i.e., the part of system 11 in contact with MLI 17. Pincer system 11 includes track assembly 21, comprised of tracks 23 and 25, together with pincers 27, 29, 31 and 33. Pincers 27 and 29 are slideably mounted on track 23, while pincers 31 and 33 are slideably mounted on track 25. Tracks 23 and 25 are attached where they intersect; they neither rotate nor translate with respect to each other. Although shown as being perpendicular, the angle of intersection between tracks 23 and 25 may be varied to suit particular circumstances. Pincers 27, 29, 31 and 33 may each be individually moved relative to their respective tracks by means of a worm gear, a chain and sprocket (neither of which are shown) or other means of locomotion well known to those skilled in the mechanical arts. Pincers 27, 29, 31 and 33 are each capable of alternately grasping and releasing MLI 17, as will subsequently be explained in detail.

Pincer system 11 can be moved across MLI 17 to any location by using the ability of a selected pair of pincers to alternatively grasp and release MLI 17, with the locomotive means engaging the grasping pincer to force translation of the track relative to the grasping pincer. The foregoing is best explained by the following example.

To move towards tear 19, pincer system 11 would first move to the right and then upwards (or first upwards and then to the right). To move to the right, pincer 29 initially grasps MLI 17, while pincer 27 is not grasping MLI 17 (the neutral mode). Pincers 27, 31 and 33 remain in the neutral mode while pincer system 11 is moving to the right. The locomotive means for track 31 is actuated to engage pincer 29 and pull track 23 through pincer 27 to the right until pincer 29 abuts track 25 (or a lesser distance if desired).

To proceed further to the right, pincer 27 (or pincers 31 and 33) are engaged to grasp MLI 17, while pincer 29 is placed in the neutral mode and moved by the locomotive means to the right, until it reaches end 37 of track 23 (or a lesser distance if desired), whereupon it grasps MLI 17 and pincer 27 (or pincers 31 and 33) are placed in the neutral mode. The locomotive means for track 23 is actuated to engage pincer 29 and again pull track 23 through pincer 29 until pincer 29 abuts track 29. The foregoing sequence is repeated until pincer system 11 is translated the desired distance to the right.

Translation of pincer system 11 relative to MLI 17 to the left would be achieved using the same sequence of steps with pincer 27 acting in concert with track 23, with pincer 29 (or pincers 31 and 33) acting to keep track assembly 21 stationary while pincer 21 is being moved in the neutral mode. Translation up, i.e., towards tear 19, is achieved using the aforementioned sequence of steps with pincer 33 acting in concert with track 25, with pincer 31 (or pincers 27 and 29) acting to keep track assembly 21 stationary while pincer 33 is being moved in the neutral mode. Translation down would be achieved using the aforementioned sequence of steps with pincer 31 acting in concert with track 25, with pincer 33 (or pincers 27 and 29) acting to keep track assembly 21 stationary while pincer 31 is being moved in the neutral mode.

Alternative track assemblies can be employed to enable nanosats to navigate around sharp corners on a spacecraft. Moreover, use of flexible, nonlinear tracks in conjunction with the pincers of the present invention could provide the ability to transport a nanosat over an uneven surface.

Figure 3:
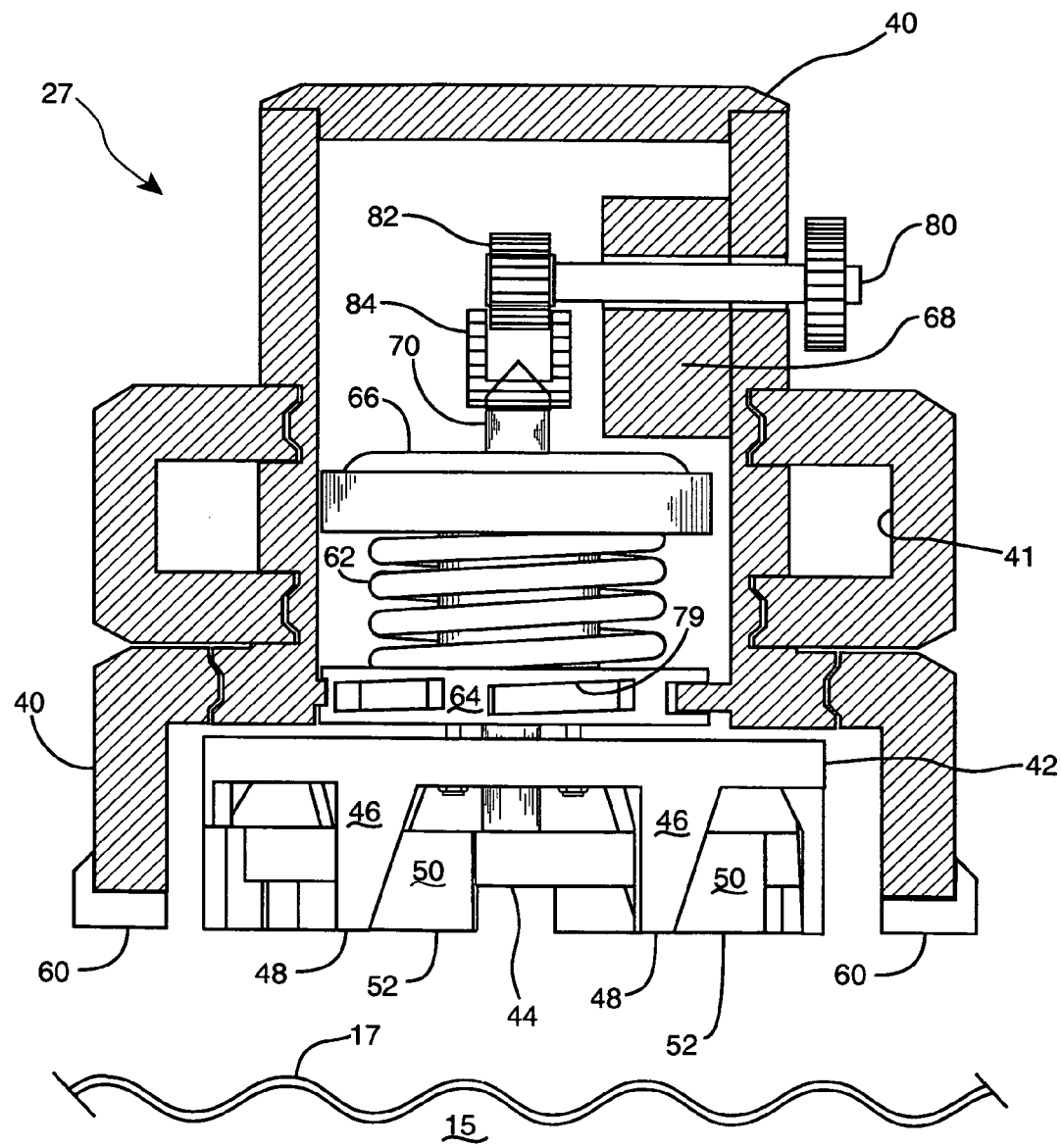
FIG. 3 is a partially sectioned front view a two-disk pincer usable as part of the pincer system shown in FIGS. 1 and 2.
Figure 4:
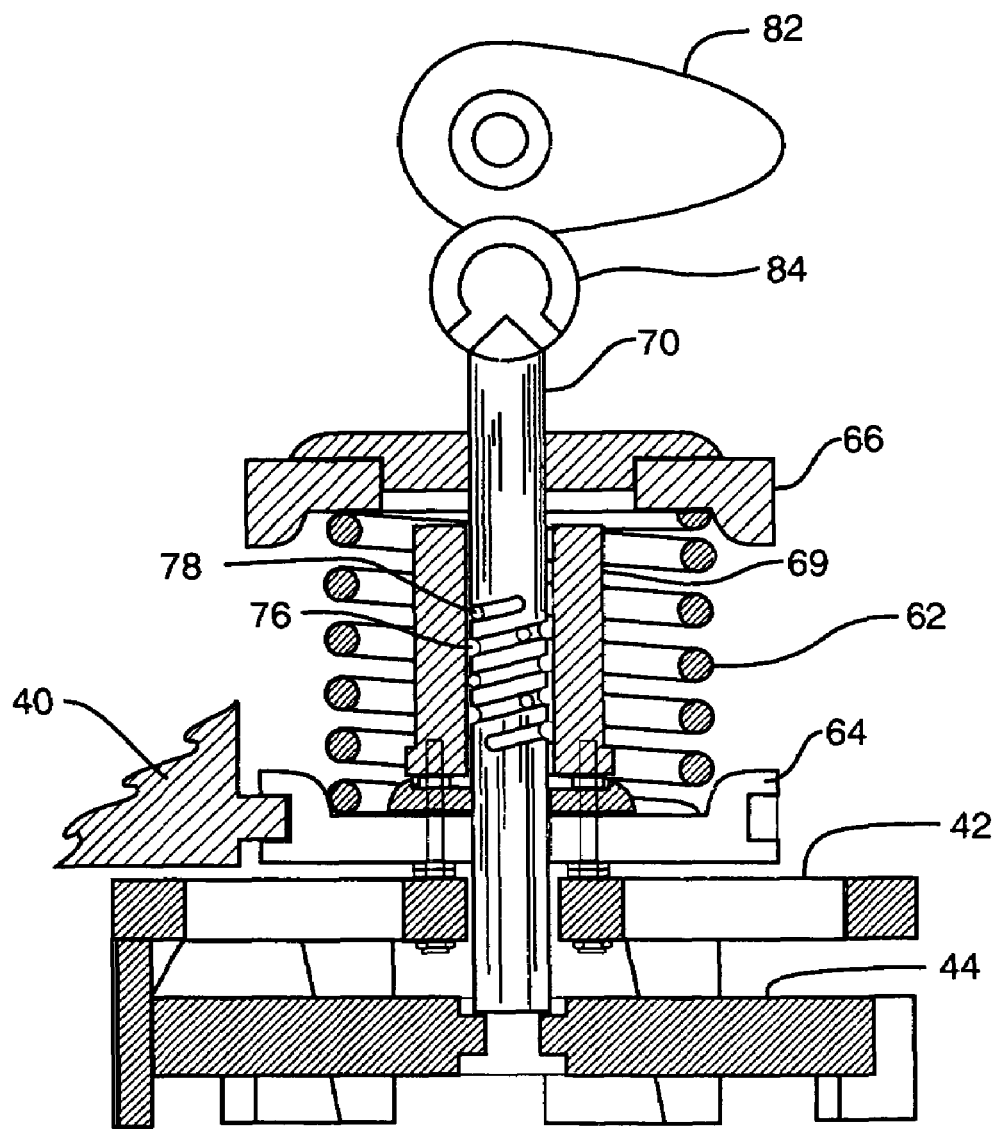
FIG. 4 is a cross-sectioned front view of the pincer shown in FIG. 3, particularly showing the shaft and its operative relationship with the inner and outer disks.
Figure 5:
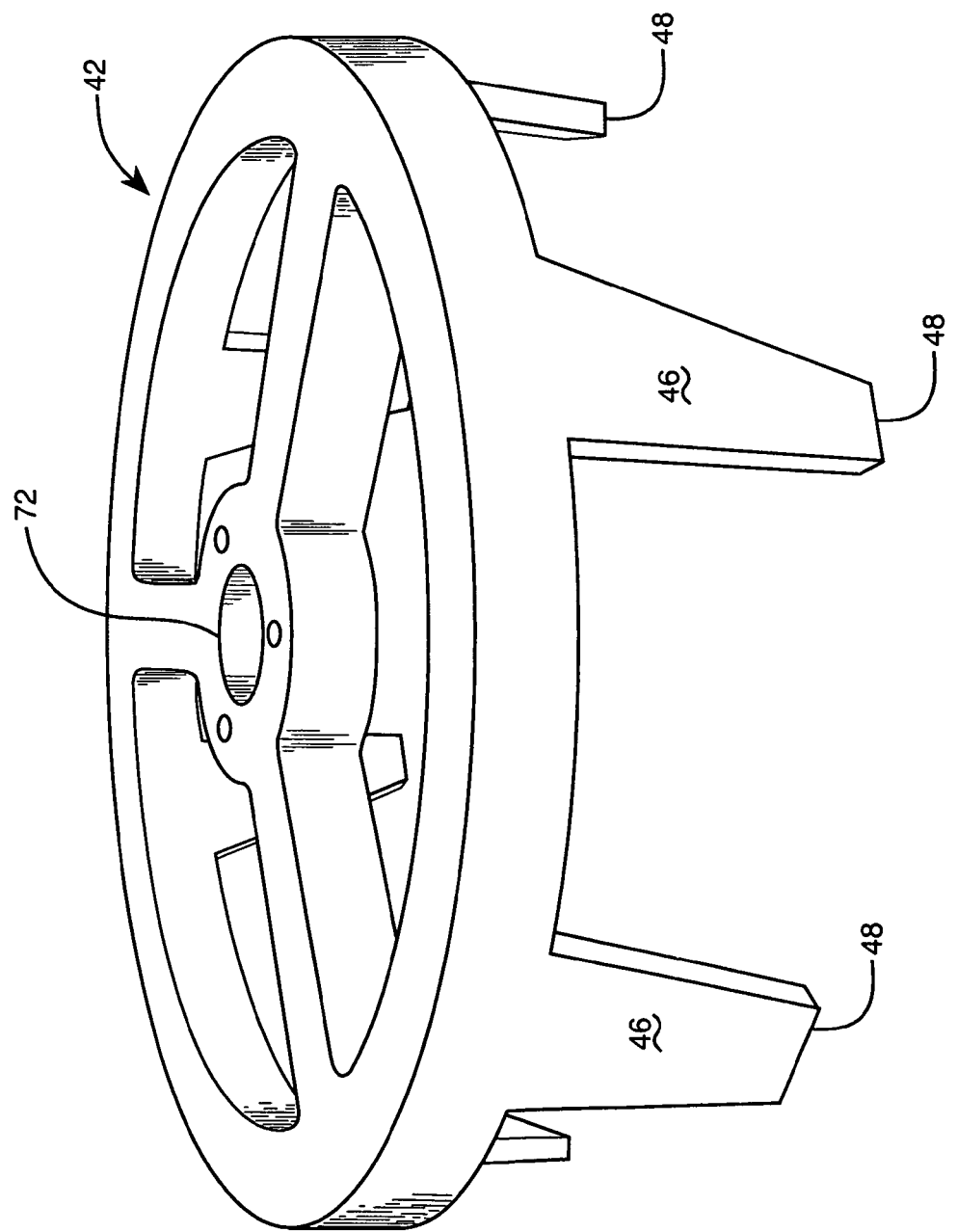
FIG. 5 is an isometric view of the outer disk of the pincer shown in FIG. 3.
Figure 6:
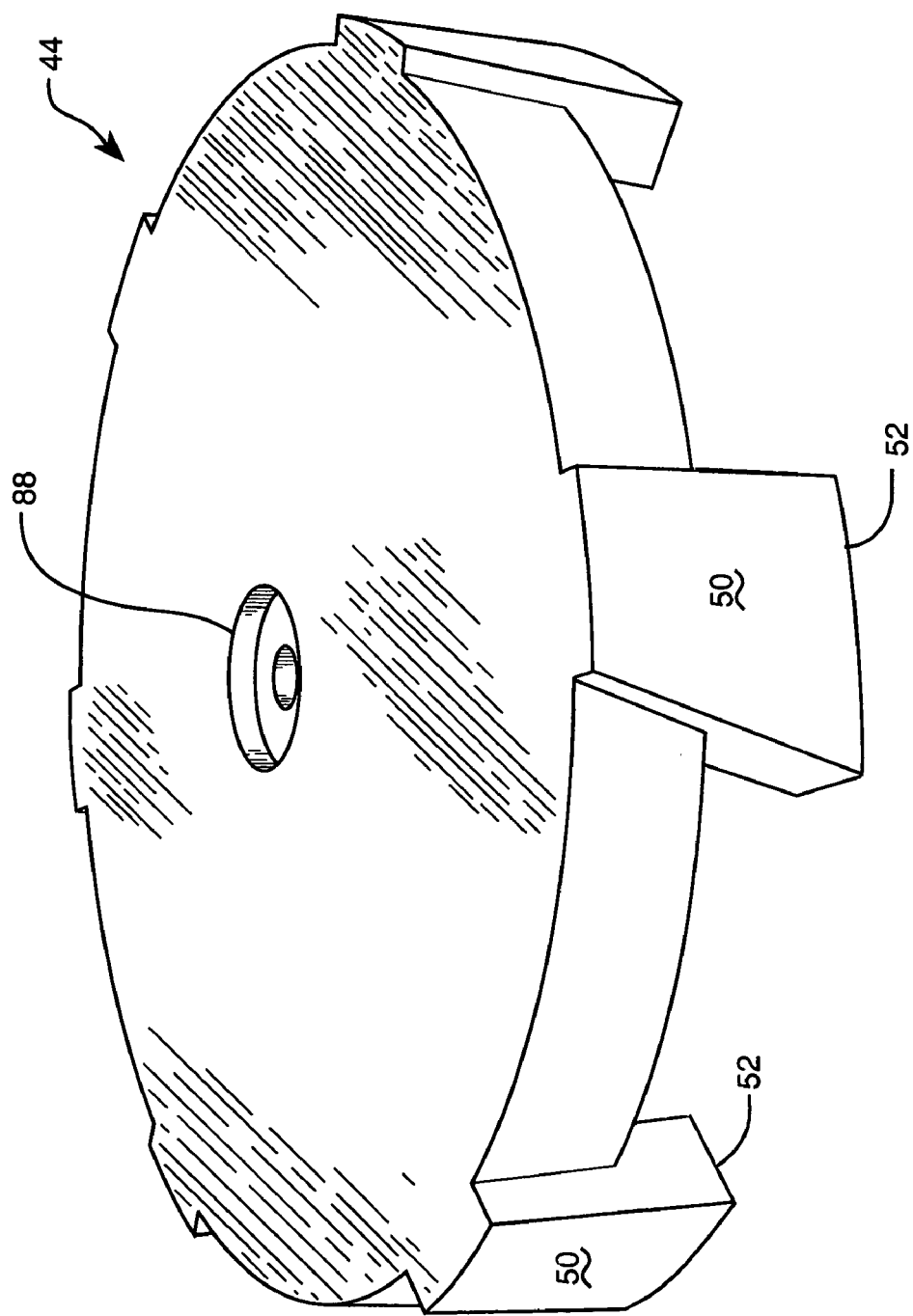
FIG. 6 is an isometric view of the inner disk of the pincer shown in FIG. 3.
Figure 7:
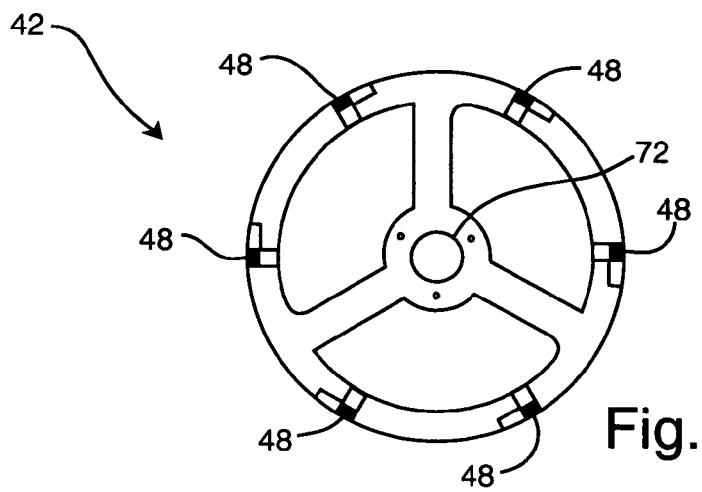
FIG. 7 is a bottom view of the outer disk of the pincer shown in FIG. 3.
Figure 8:
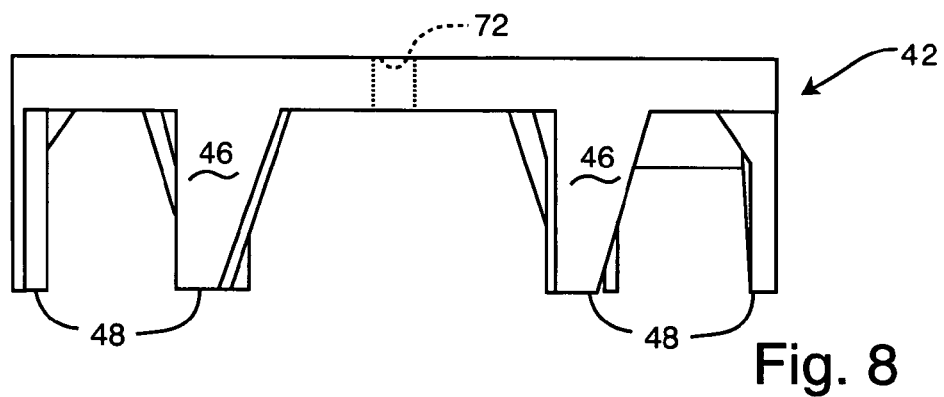
FIG. 8 is a front view of the outer disk of the pincer shown in FIG. 3.
Figure 9:
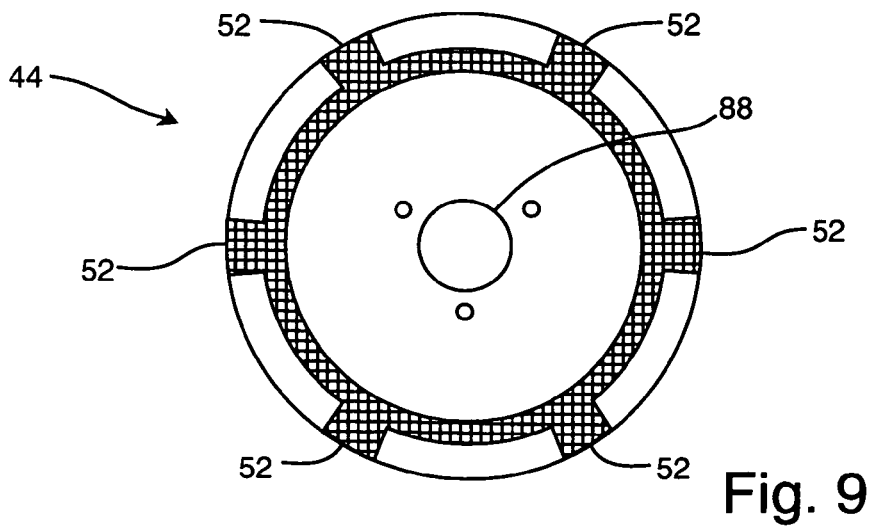
FIG. 9 is a bottom view of the inner disk of the pincer shown in FIG. 3.

FIG. 3 is a partially sectioned front view of pincer 27, a pincer of the present invention. Pincer 27 includes housing 40, which is slideably attached to track 23 (not shown) by means of brackets 41. Housing 40 is also attached to the locomotive means (not shown) for track 23, which provides for translation of pincer 27 along track 23. Pincer 27 includes disks 42 and 44. FIG. 4 is a cross-sectioned front view of pincer 27, with housing 40 removed. FIG. 5 is a perspective view of disk 42 and FIG. 6 is a perspective view of disk 44. FIGS. 7 and 8 respectively show bottom and front views of disk 42. FIG. 9 is a bottom view of disk 44.

Figure 10:
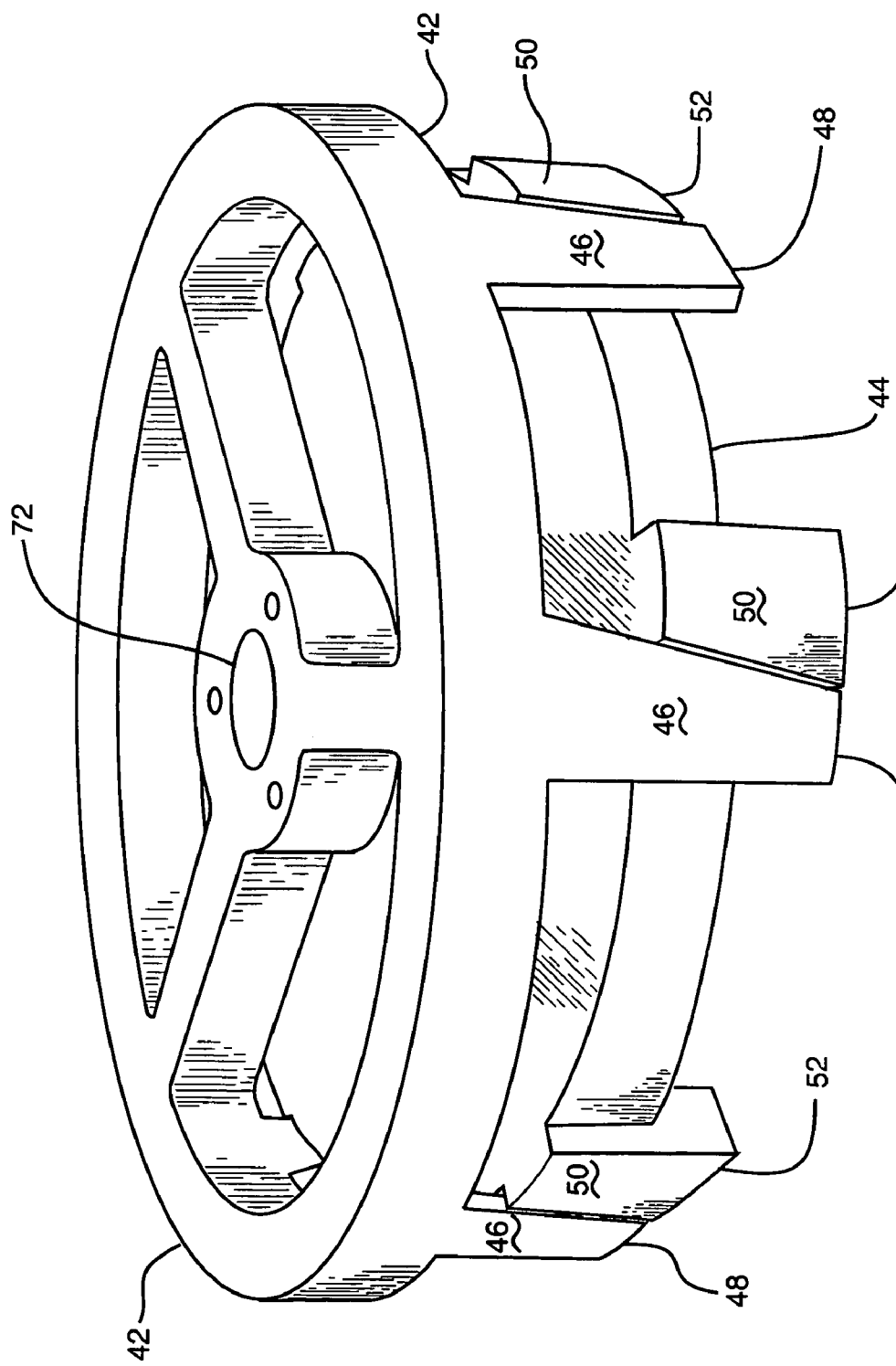
FIG. 10 is an isometric view of the inner disk and outer disk of the pincer shown in FIG. 3, in their open operative position.

As shown in the aforementioned figures, disk 42 includes six legs 46 that are equidistantly spaced apart from one another, with each leg having a foot 48. Disk 44 includes six legs 50 that are equidistantly spaced from one another, with each leg having a foot 52. Although six legs are shown for each disk, it should be noted that the present invention will function in a manner consistent with the teachings herein where there are more or fewer legs per disk. As illustrated by the perspective view provided by FIG. 10, disk 44 is nested within disk 42. FIG. 10 shows disks 42 and 44 in their completely open, neutral position, i.e., not grasping MLI 17.

Figure 11:
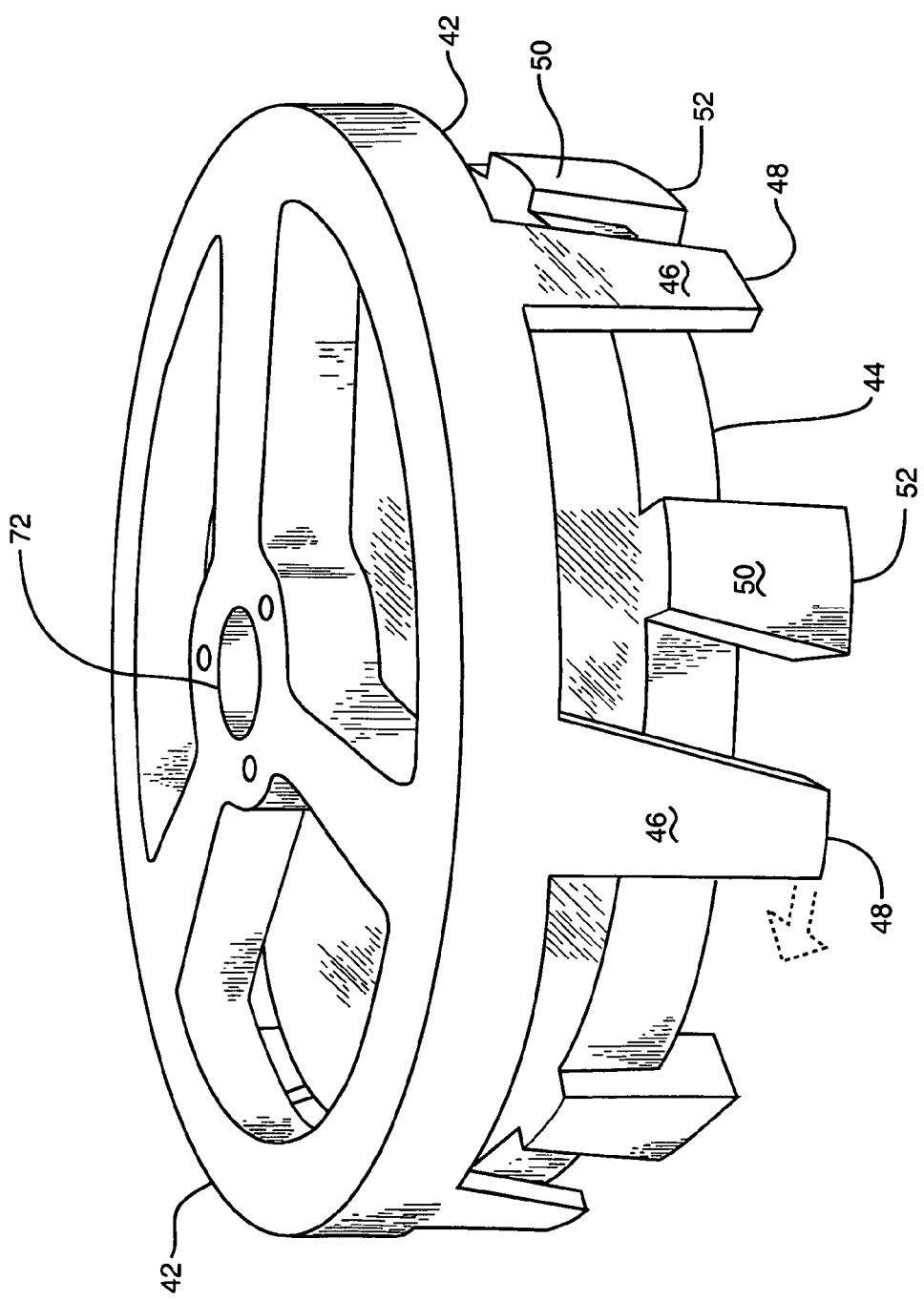
FIG. 11 is an isometric view of the inner disk and outer disk of the pincer shown in FIG. 3, with the outer disk being rotated clockwise towards its engaged, grasping operative position.
Figure 12:
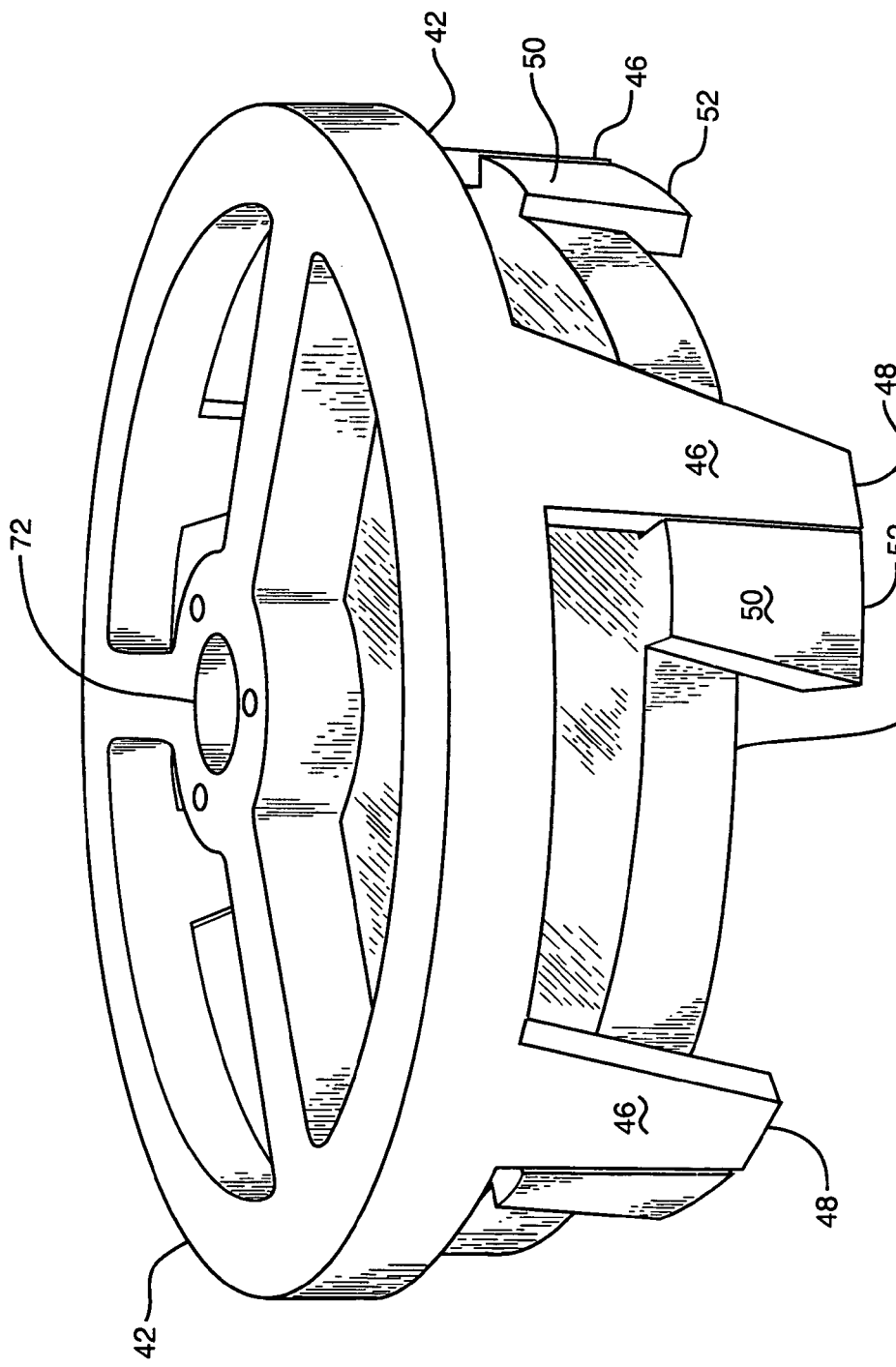
FIG. 12 is an isometric view of the inner disk and outer disk of the pincer shown in FIG. 3, with the outer disk rotated into full engagement with the stationary inner disk.

To engage, or grasp, MLI 17, feet 52 are pressed down into MLI 17, causing protuberances of the material around the feet. As shown in FIG. 11, disk 42 is then rotated clockwise relative to stationary disk 44. FIG. 12 shows disks 42 and 44 in the fully engaged position, with each of legs 46 brought into near abutment with the corresponding leg 50 that opposes it and thereby limits its rotation. This near abutment captures and squeezes the extruded portion of MLI 17 between legs 46 and 50 (it is not complete abutment only because the extruded portion of MLI will lie between legs 46 and 50). Both disks 42 and 44 can be further rotated together after they have secured MLI 17 between their respective opposing legs to form a stronger hold on the fabric.

The remaining parts of pincer 27 cooperate to obtain the aforementioned pressure of feet 52 against MLI 17, and the of rotation of disk 42 relative to stationary disk 44 in order to effect their engagement. More particularly, rubber pads 60 of housing 40 are first moved into contact with MLI 17 while disks 42 and 44 are in an open state. The opposing resistive force of underlying satellite 15 acts against pads 60. Spring 62 is captured between annular retaining collar 64 and annular spring retainer 66. Housing 40 is mounted on retaining collar 64. Thus, housing 40 is free to move upward until the initial distance between retainer 66 and stop block 68 has been taken up, whereupon the compressive spring force opposes further upward travel. The resistive force of underlying satellite 15 prevents the further downward travel of pads 60, and exposes feet 48 and 52, allowing them to come into contact with MLI 17.

As shown in FIG. 4, retaining sleeve 69 sits between retaining collar 64 and spring retainer 66. Shaft 70 passes through an annular hole in the center of spring retainer 66, through a cylindrical bore in retaining sleeve 69, through an annular hole in the center of retaining collar 64, and through annular hole 72 in the center of disk 42. Shaft 70 includes races 76 that accommodate ball bearings 78. The foregoing openings, together with ball bearings 78, allow the axial rotation as well as the vertical translation of shaft 70 relative to retaining collar 64, spring retainer 66 and retaining sleeve 69. Retaining sleeve 69, retaining collar 64 and disk 42 are bracketed to each other. Disk 42 is thus also free to rotate about, and translate vertically relative to, the axial axis of shaft 70. Retaining collar 64 also includes grooves 79.

Camshaft 80 includes cam 82. Shaft 70 includes shaft top 84 and shaft bottom 86. Shaft bottom 86 rests in annular cavity 88 in the top of disk 44. Cam 82 and shaft top 84 are mechanically engaged and shaped such that the rotation of camshaft 80, and therefore cam 82, creates a downward force on shaft top 84, shaft 70, and disk 44. This results in disk 44, and thus feet 52, being slowly pressed against MLI 17, causing the material to form protuberances about feet 52.

As camshaft 80 is rotated, disk 42 is simultaneously rotated by force applied by metal tabs (not shown) inserted into grooves 71. Disk 42 is rotated clockwise approximately 32°, until its legs 46 abut legs 50 of stationary disk 44, thereby capturing the protuberances occurring around feet 52. As previously noted, both disks 42 and 44 can be subsequently rotated together to strengthen their hold on the extruded MLI 17.

It is to be understood that the preceding is merely a detailed description of an embodiment of this invention, and that numerous changes to the disclosed embodiment can be made in accordance with the disclosure herein without departing from the spirit or scope of the invention. The preceding description, therefore, is not meant to limit the scope of the invention. Rather, the scope of the invention is to be determined only by the appended claims and their equivalents.

What is claimed is:

1. A pincer apparatus for grasping a pliable material covering a hard surface, comprising:
   an inner disk having inner disk legs extending therefrom;
   an outer disk having outer disk legs extending therefrom;
   each of the inner disk legs having a complimentary outer disk leg;
   the inner disk having an inner disk center and the outer disk having an outer disk center;
   the inner disk center and the outer disk center lying on an axis;
   the inner disk legs being for contacting the material;
   means for rotating the outer disk about the axis and relative to the inner disk until protuberances in the material, formed adjacent to where the inner disk legs contact the material, are squeezed, respectively, between each of the outer disk legs and its complimentary inner disk leg;
   a shaft lying coaxially with the axis;
   the shaft being connected to the inner disk and having a shaft top; and
   a cam and the shaft top being mechanically engaged and respectively shaped to generate a shaft force against the inner disk when the cam is rotated whereby
   the shaft force is generated and applied against the material by the inner disk legs when the cam is rotated.

2. A pincer apparatus as defined in claim 1 wherein the outer disk rotating means includes:
   an annular sleeve attached to the outer disk;
   the shaft passing slidably through the sleeve; and
   the sleeve being rotatable about the axis and relative to the shaft, whereby
   the outer disk is rotated about the axis when the sleeve is rotated by application of a rotational force.

3. A pincer apparatus as defined in claim 2 further comprising:
   a housing covering the shaft, the inner disk, the outer disk, and a spring;
   the housing having pads for contacting the material; and
   the spring circumscribing the shaft and being connected to the housing, for allowing the housing to translate relative to the material when a resistive force is applied against the pads by the hard surface.

4. A pincer apparatus as defined in claim 3 wherein:
   the outer disk has a circular periphery;
   the outer disk legs extend parallel to the axis; and
   the inner disk legs extend parallel to the axis.

5. A pincer apparatus as defined in claim 3 further comprising:
   a plurality of tracks, with each of the tracks including a locomotive means;
   a plurality of the housings being slidably engaged with each of the tracks; and
   each of the housings being mechanically engaged with the locomotive means included in the track with which the housing is slidably engaged, whereby
   the housings are moved by the respective locomotive means along the track to which each of the housings is slideably engaged.

6. A pincer apparatus as defined in claim 5 wherein the tracks are two tracks that intersect.

7. A pincer apparatus as defined in claim 6 wherein the two tracks intersect perpendicularly and each of the two tracks is straight.

8. A pincer apparatus as defined in claim 6 wherein:
   the tracks are nonlinear and flexible, whereby
   the housings are moved along nonlinear paths.

9. A pincer apparatus as defined in claim 5 further comprising:
   means for removably attaching a nanosat; and
   a spacecraft having an exterior surface; wherein
   the pliable material is multi-layered insulation; and
   the hard surface is the exterior surface, whereby
   the nanosat is attached to the pincer apparatus and transported across the multi-layered insulation to perform tasks related to the space vehicle.

10. A pincer apparatus for attaching to a pliable material covering a hard surface, comprising:
   a spring-loaded housing having an opening and including rubber pads disposed around the opening, the pads being for contacting a pliable material and causing the housing to be pushed away from the pliable material, thereby revealing a two-disk pincer normally contained within the housing;
   the two-disk pincer further comprising an inner disk having a inner disk periphery and including a plurality of inner disk legs disposed along the inner disk periphery and extending toward an opening in the housing, and an outer disk having an outer disk periphery and including a plurality of complimentary outer disk legs disposed along the outer disk periphery;

a shaft connected to the inner disk for applying a force against the inner disk, the force being normal to the hard surface; and the outer disk being rotatable in an engagement direction to cause at least one of the outer disk legs to squeeze pliable material that might be located between any of the outer disk legs and the complimentary inner disk legs.

11. A pincer apparatus as defined in claim 10 wherein:

the outer disk periphery is circular, is rotatable about an axis, has a center lying along the axis, and includes a concentric annular hole;

the shaft has an axial axis lying collinear with the outer disk axis of rotation; and the shaft passes slideably through the hole, whereby the outer disk can rotate about the outer disk axis of rotation, relative to the shaft.

12. A pincer apparatus as defined in claim 11 further comprising:

a plurality of intersecting tracks, with each of the tracks including a locomotive means;

a plurality of the housings being slidably engaged with each of the tracks; and each of the housings being mechanically engaged with the locomotive means included in the track with which the housing is slidably engaged, whereby the housings and the two-disk pincers respectively contained therein are moved by the respective locomotive means along the respective track to which each of the housings is slideably engaged.

13. A pincer apparatus as defined in claim 12 further comprising:

means for removably attaching a nanosat; and a spacecraft having an exterior surface; wherein the pliable material is multi-layered insulation; and the hard surface is the exterior surface, whereby the nanosat is attached to the pincer apparatus and transported across the multi-layered insulation to perform tasks related to the spacecraft.

* * * * *